United States Patent [19]
Hildebrand

[11] Patent Number: 5,960,858
[45] Date of Patent: Oct. 5, 1999

[54] AIR CONDITIONING SYSTEM FOR A MOTOR VEHICLE

[75] Inventor: Reinhard Hildebrand, Redwitz, Germany

[73] Assignee: Valeo Klimasysteme GmbH, Rodach, Germany

[21] Appl. No.: 08/648,051

[22] PCT Filed: Sep. 18, 1995

[86] PCT No.: PCT/EP95/03671

§ 371 Date: Jul. 29, 1996

§ 102(e) Date: Jul. 29, 1996

[87] PCT Pub. No.: WO96/09180

PCT Pub. Date: Mar. 28, 1996

[30] Foreign Application Priority Data

Sep. 19, 1994 [DE] Germany .............................. 41 14 743

[51] Int. Cl.⁶ .............................. B60H 3/00; F25B 27/00
[52] U.S. Cl. .................................. 165/42; 62/236; 62/244
[58] Field of Search ......................... 237/12.3 A; 62/244, 62/236; 165/42

[56] References Cited

U.S. PATENT DOCUMENTS

| | | |
|---|---|---|
| 4,289,195 | 9/1981 | Bellot et al. . |
| 4,456,055 | 6/1984 | Yoshimi et al. . |
| 4,852,638 | 8/1989 | Hildebrand et al. . |
| 4,858,676 | 8/1989 | Bolfik .......................................... 165/42 |
| 5,127,576 | 7/1992 | Weatherhead et al. . |
| 5,177,978 | 1/1993 | Brown ........................................ 62/236 |
| 5,209,081 | 5/1993 | Matsuoka ................................. 62/244 |
| 5,226,472 | 7/1993 | Benevelli et al. . |
| 5,275,012 | 1/1994 | Dage .......................................... 62/208 |
| 5,280,852 | 1/1994 | Dauvergne .......................... 237/12.3 A |
| 5,687,790 | 11/1997 | Doi ........................................... 165/24 |

FOREIGN PATENT DOCUMENTS

| | | |
|---|---|---|
| 0 216 104 | 4/1987 | European Pat. Off. . |
| 0 363 038 | 4/1990 | European Pat. Off. . |
| 2 437 312 | 4/1980 | France . |

Primary Examiner—Ira S. Lazarus
Assistant Examiner—Lance Chandler
Attorney, Agent, or Firm—Morgan & Finnegan, L.L.P.

[57] ABSTRACT

In order to assure with simple controlling and rapid adaptation to different temperature conditions an energy-saving adjustment of the temperature of the interior of a motor vehicle, it is possible by means of a single temperature regulator [(T)] and through adjustment of the latter to adjust such regulator in a first regulating range, in particular in the range of 0 to 30% of the total regulating range, from a high refrigeration output to a lower refrigeration output independently of the driving motor of the motor vehicle, and to adjust in a final regulating range a useful heat source [(EH or DH)] from a lower output of heat to a high output of heat. According to a preferred exemplified embodiment, the first regulating range is separated from the final regulating range by an intermediate regulating range with air-side adjustment in a mixing space [(MR)] and/or water-side adjustment in a heat exchanger [(WT)].

20 Claims, 9 Drawing Sheets

AIR CONDITIONING SYSTEM FOR A MOTOR VEHICLE

FIELD OF THE INVENTION

The invention relates to an air-conditioning system for a motor vehicle according to patent claim 1.

BACKGROUND OF THE INVENTION

In connection with known air-conditioning systems, refrigeration or dehumidification at excessive inside temperatures is generated based on a refrigeration unit coupled with the driving engine of the motor vehicle, and, if the inside temperature is too low, heat is generated by switching on the heat exchanger, which is supplied by the cooling circulation of the driving engine of the motor vehicle and consequently with the off-heat of said engine. The inside temperature is controlled or regulated with such systems substantially through air-side adjustment by setting a mixed-air valve on the inlet of a mixing chamber, by which the ratio of admitted cold air to admitted hot air is variable, and/or with water-side adjustment through setting a valve, by which the feed of cooling fluid to the heat exchanger is variable, such fluid being heated by the off-heat of the engine of the motor vehicle. Such an air-conditioning system requires high energy and operating expenditure and can react to changing temperature conditions in the interior of the motor vehicle only sluggishly or not at all.

As compared to the above, a more rapid adaptation to different temperature conditions, combined at the same time with a substantially simplified operation and reduced energy expenditure can be accomplished according to the invention by virtue of the instruction of claim 1. Advantageous further developments of the invention are the subject matter of the subsidiary claims.

By using a refrigeration unit that is self-regulating or self-controlling independently of the driving engine of the motor vehicle, on the one hand, and a separate controllable useful heat source that is consequently independent of the amount of off-heat of the cooling medium of the driving engine, it is possible to rapidly adapt the system to the temperature of the interior space with only the absolutely required expenditure of energy and also in a very simple way due to the adjustment connection between the refrigeration unit and the useful heat source, using only one single temperature regulator.

The above-described motor vehicle air-conditioning system with a regulating range of the useful heat source adapted to the regulating range of the refrigeration unit is especially suitable for vehicles without the usual air-side adjustment by means of a mixed-air valve and/or water-side adjustment of a heat exchanger supplied with off-heat of the cooling water of the motor drive of the motor vehicle, and thus particularly for air-conditioning systems operated without the exploitation of off-heat. When used for motor vehicles solely or partly driven by an internal combustion engine with a cooling water circulation through a heat exchanger in the air-conditioning system and air-side temperature adjustment by means of a mixed-air valve in a mixing space, into which fresh air can be admitted on the inlet side, on the one hand, and air heated by a heat exchanger supplied with cooling water, on the other hand, provision is made according to a preferred exemplified embodiment of the invention between the first regulating range and the last regulating range for an intermediate regulating range with air-side adjustment by at least one mixed-air valve in a mixing space and/or water-side adjustment by at least one valve in a heat exchanger supplied with off-heat.

The first regulating range preferably extends over 0 to 30% of the total regulating range of the single tempering adjustment means, and the regulating range of the useful heat source, if an intermediate regulating range is present with air-side or water-side adjustment, extends over a regulating range of 60 to 100% of the total regulating range of the single temperature regulator.

BRIEF DESCRIPTION OF THE DRAWINGS

The invention as well as additional advantageous developments of the invention according to features of the subordinate claims are explained in greater detail in the following by reference to exemplified embodiments schematically shown in the drawings, in which:

DESCRIPTION OF THE PREFERRED EMBODIMENTS

Figure 1:
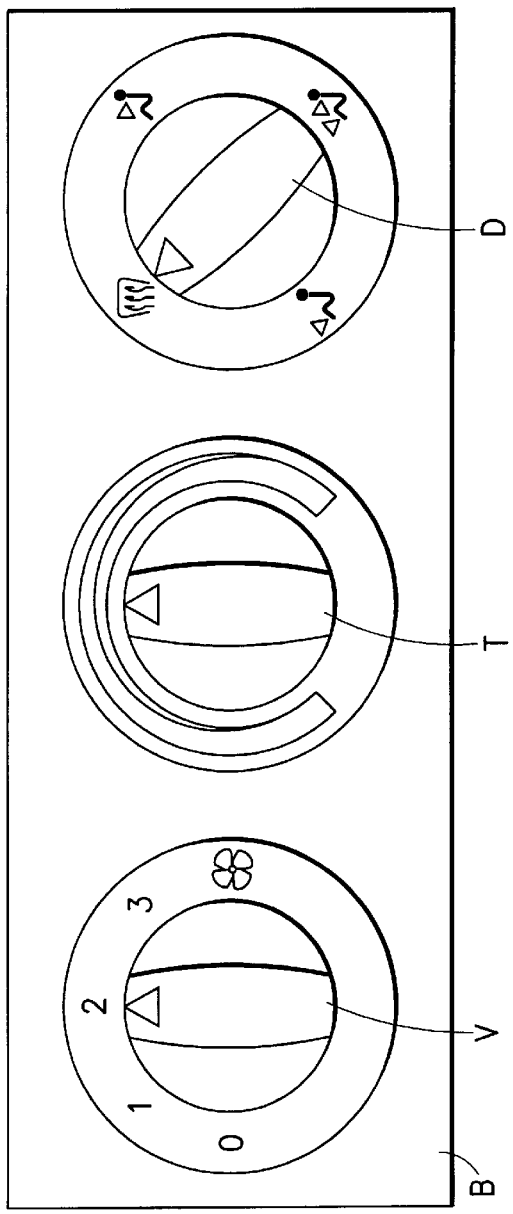
FIG. 1 is a plan view of a preferred facing of a central operating unit for controlling the inside temperature of a motor vehicle in accordance with the present invention.
Figure 2:
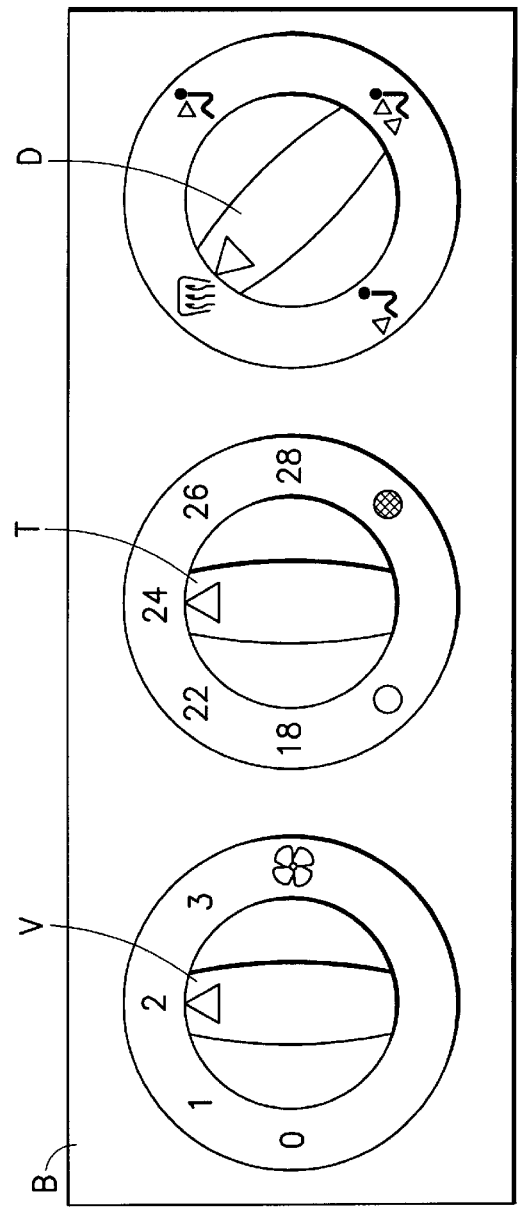
FIG. 2 is a plan view of a plan view of a preferred facing of a central operating unit for regulating the inside temperature of a motor vehicle in accordance with the present invention.

FIGS. 1 and 2 show two different views of the facing of a central operating unit B mounted in the center plane, in particular in the dashboard of a motor vehicle, with as ventilator switch V for controlling the amount of air, via which it is possible to adjust, for example the rpm-stages of a central ventilator on the inlet of the heating or air-conditioning unit; furthermore, with an adjusting element D for distributing the air, said element having four symbols each showing the direction of flow, as well as with a center temperature regulator T for setting a desired temperature in the interior space of the motor vehicle. FIG. 1 shows an operating unit for controlling and FIG. 2 an operating unit for regulating the inside temperature. The temperature regulator T, which is designed in the form of a rotary button, is adjustable over a regulating range of about 270 degrees.

Figure 3:
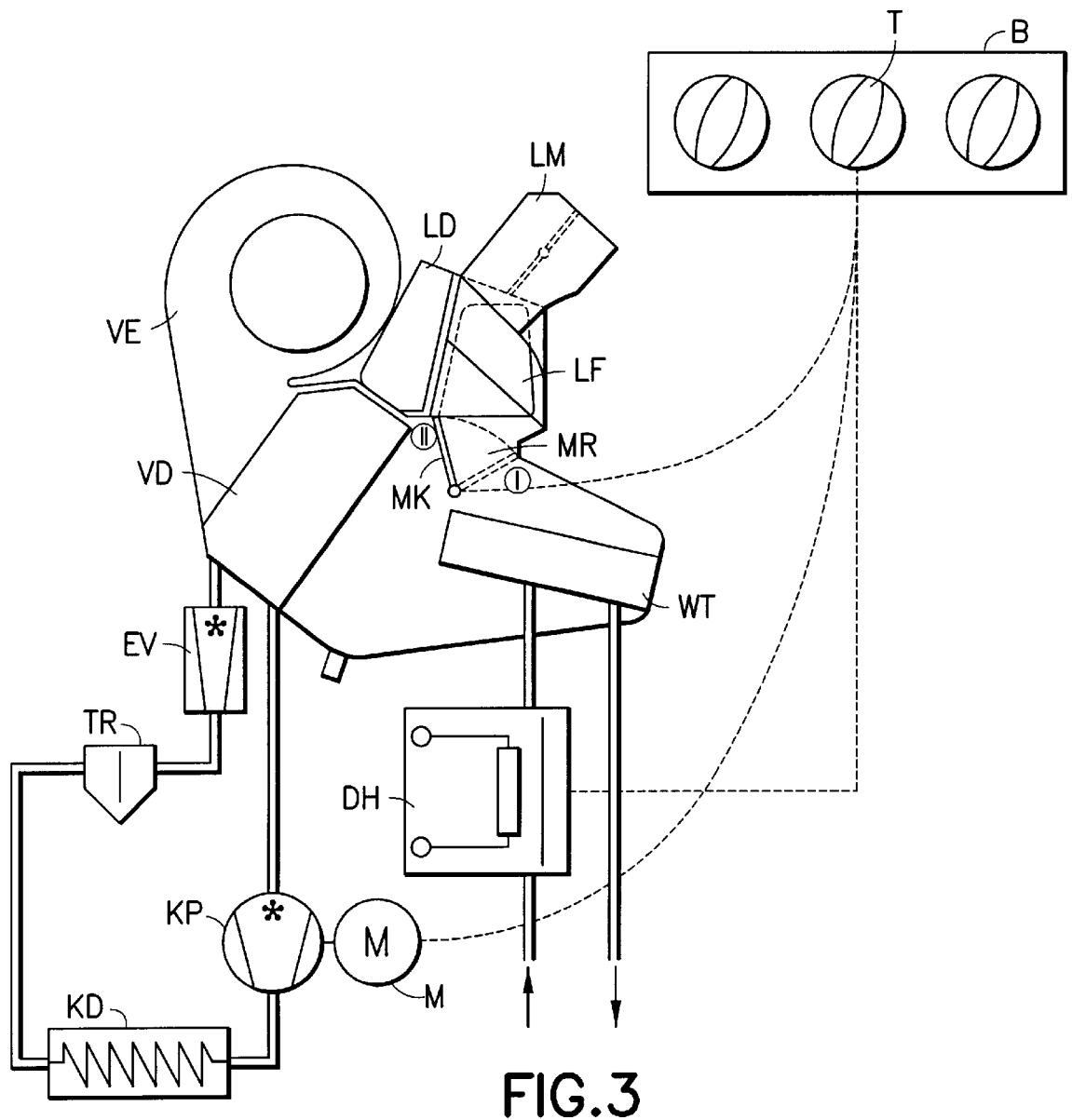
FIG. 3 is a schematic illustrating a preferred embodiment of an air conditioning system in accordance with the present invention.
Figure 4:
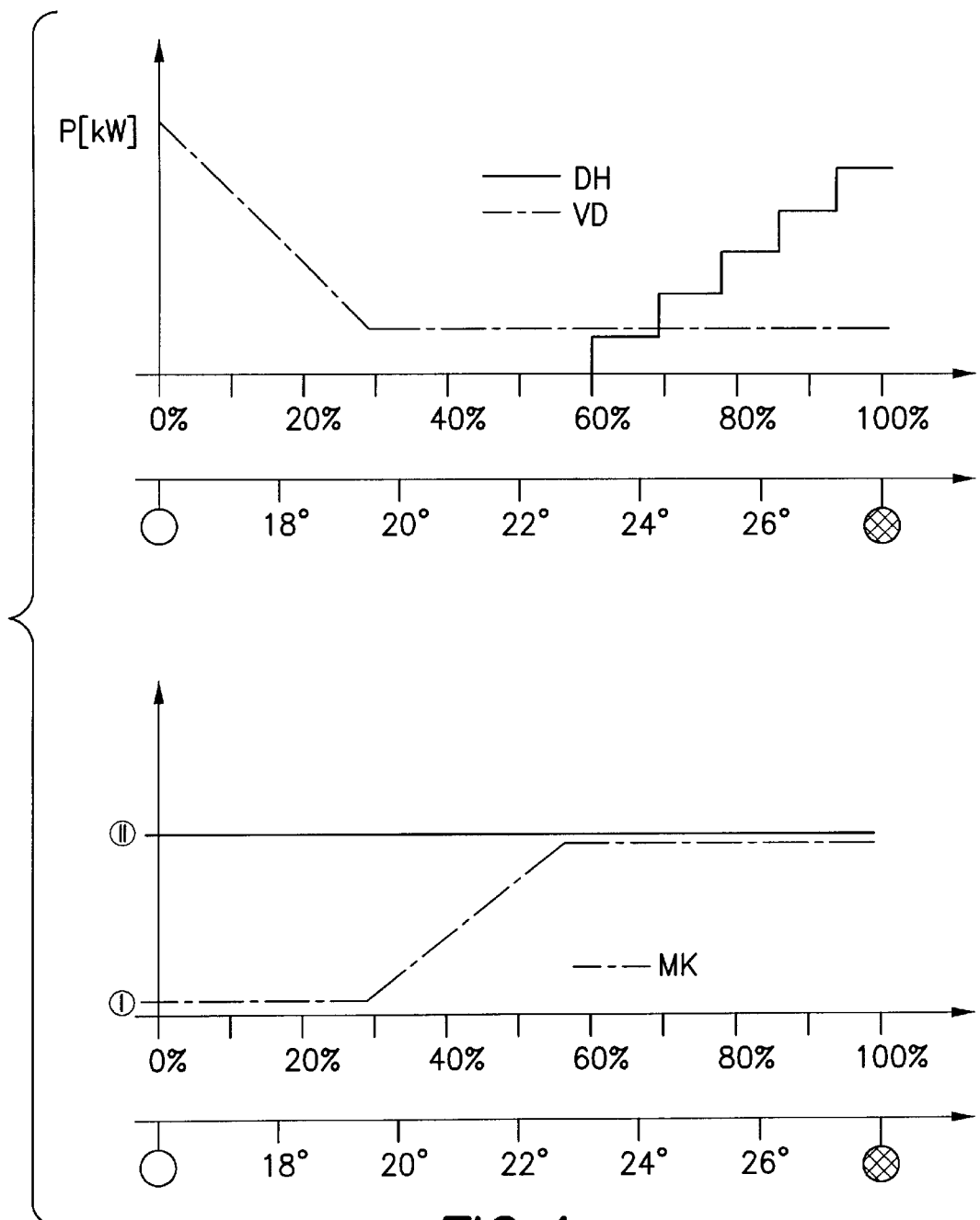
FIG. 4 is a schematic illustrating the functional curves associated with a preferred embodiment of the present invention.

FIGS. 3 and 4 show a first exemplified embodiment of an air-conditioning system according to the invention, which is based on a structure basically known, for example from EP-B-2-0 016 104, with ventilator VE arranged on the inlet side in a plastic housing, an evaporator VD arranged downstream in the flow of air, a subsequent division of the stream of air to mixing space MR either as a direct stream of fresh air or as a stream of hot air heated by the heat exchanger WT, the latter being supplied by the cooling fluid of the driving engine of the motor vehicle, and with a following exit of the tempered streams of air into a defrost air duct LD or a center-plane air duct LM or an air duct LF in the foot space. Tempering can take place purely on the air side by adjusting a mixed-air valve MK on the inlet of the mixing space MR in that the mixed-air valve MK is adjustable with intermediate settings between a first closing position I with complete shutoff of the stream of hot air and complete admission of the stream of fresh air, on the one hand, and a second final position II with complete shutoff of the stream of fresh air and complete release of the stream of hot air.

According to the invention, in addition to the usual components such as an evaporator VD, an expansion valve EV, a dryer TR and a condenser KD, provision is made in the cooling circuit for a compressor KP, the latter being controllable independently of the driving engine of the motor vehicle and driven by an electric motor M; furthermore, according to the invention, for supplementing the heat exchanger WT, the latter being supplied with off-heat, a useful heat source in the form of a continuous-flow heater DH is arranged in the circuit of said heat exchanger WT, said heater being adjustable in a final regulating range by the single temperature regulator T.

The function curves according to FIG. 4 show that the refrigeration unit (VD; KP) is adjusted via the setting of the compressor KP in a first regulating range, preferably in the range of 0 to 30% of its total regulating range, and particularly continuously from a top refrigeration output to a lower refrigeration output, the latter usefully still assuring adequate dehumidification of air in the interior space. Of course, cooling is automatically switched off once a temperature connected with the risk of icing has been reached. In a final regulating range, preferably of about 60 to 100% of the total regulating range of the single temperature regulator T and particularly stage by stage, the useful heat source in the form of a continuous-flow heater DH is set from a lower heat output to a higher heat output. With air-side tempering—which, per se, is present—with a mixed air valve MK and a heat exchanger WT heated by the cooling medium, provision is made between the first regulating range and the final regulating range for an intermediate regulating range with air-side adjustment of the mixed air valve MK from a first final position I with complete shutoff of the mixing space MR against the stream of hot air of the heat exchanger WT, or complete opening versus the inlet-side stream of fresh air, to a second final position II with complete opening of the mixing space MR versus the stream of hot air of the heat exchanger WT and thus complete shutoff against the stream of fresh air, whereby the adjustment between the first final position I and the second final position II usefully takes place continuously. In the functional curves of the operating sequences effected by the single temperature regulator T, the percentage data relate to the total regulating range of the temperature regulator T according to FIG. 1, and the temperature data relate to the temperature adjustment range according to FIG. 2.

Figure 5:
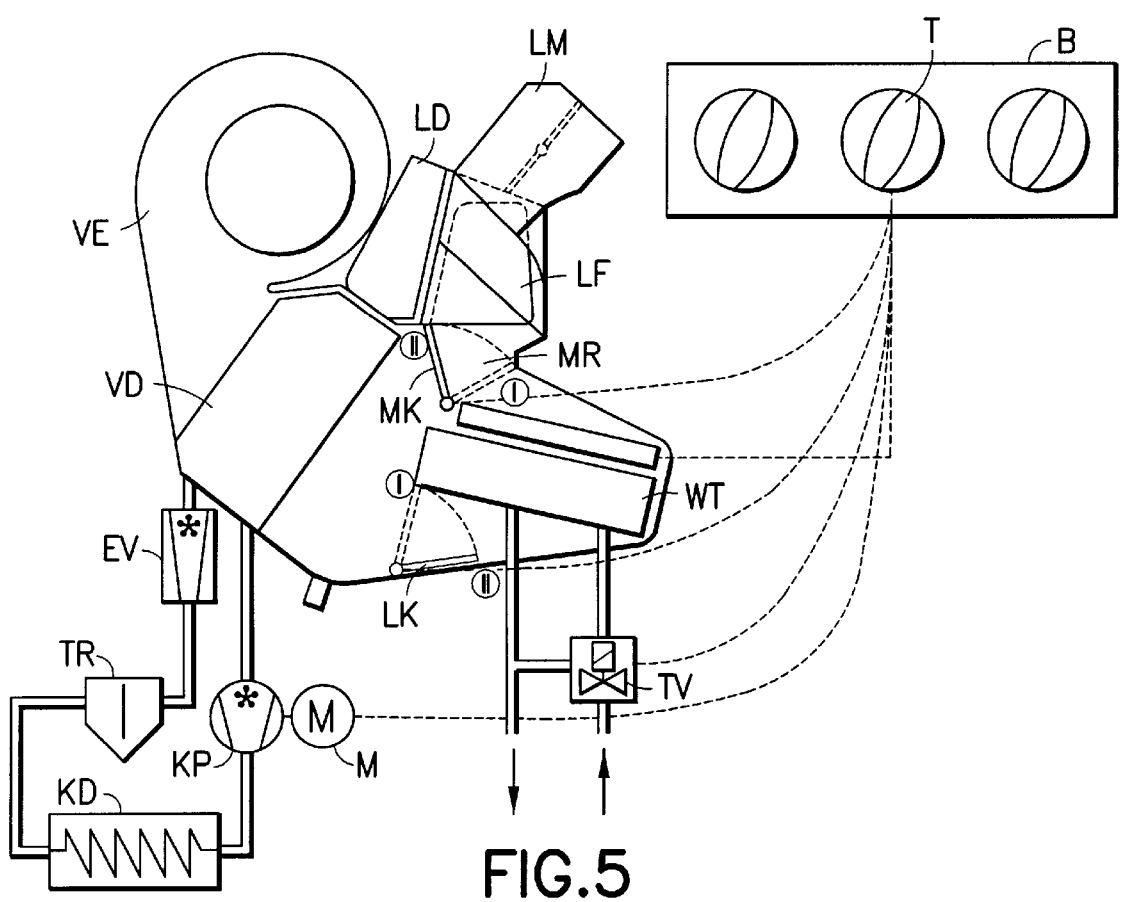
FIG. 5 is a schematic illustrating another preferred embodiment of an air conditioning system in accordance with the present invention.
Figure 6:
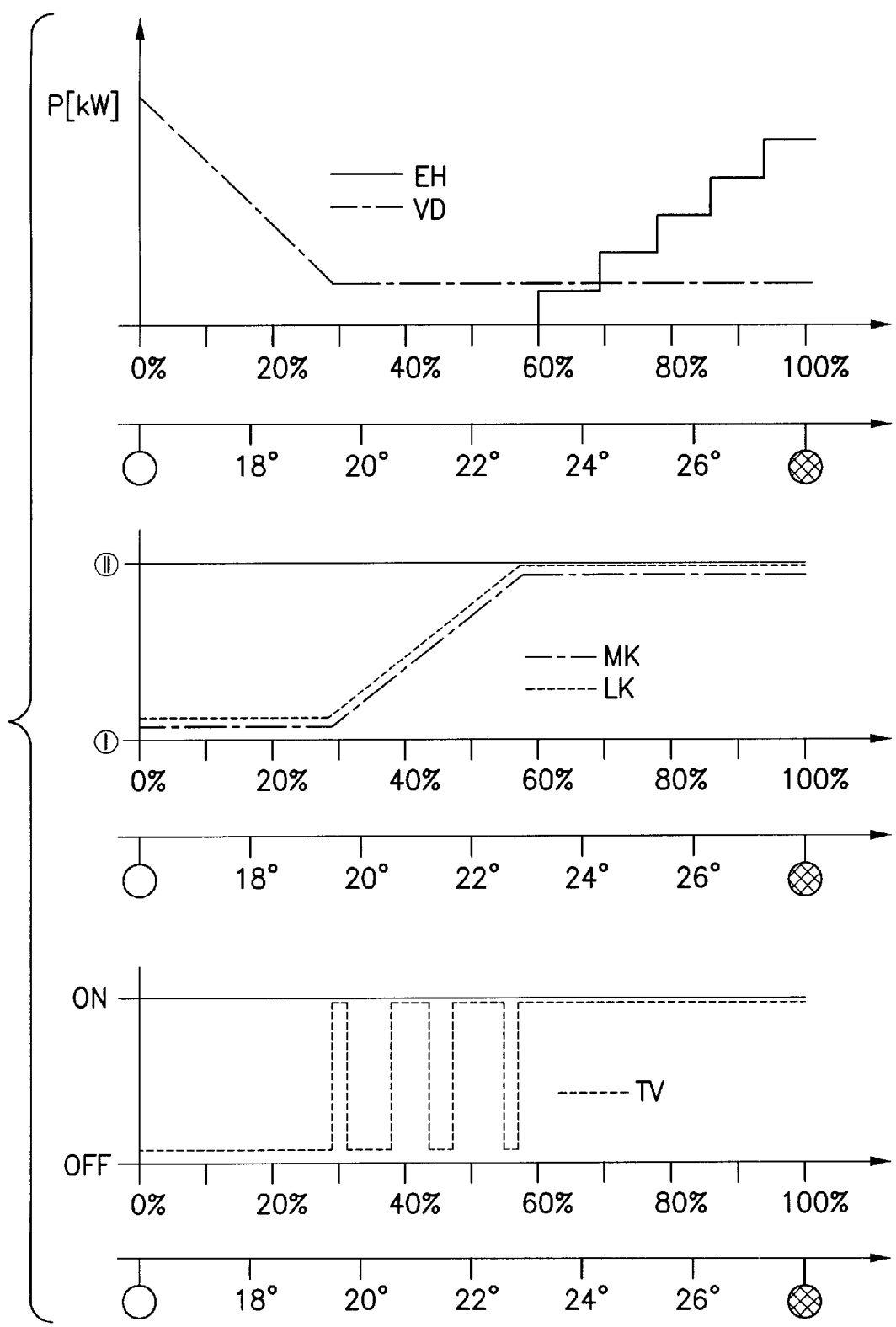
FIG. 6 is a schematic illustrating the functional curves associated with the preferred embodiment of the present invention illustrated in FIG. 5.

FIGS. 5 and 6 differ from FIGS. 3 and 4 in that the useful heat source is separate, adjustable electric heating, in particular a PCT-heating preferably arranged downstream of the cooling water-supplied heat exchanger WT, said electric heating being adjustable in dependence of the temperature regulator T in the final regulating range of the latter. In addition to the mixed-air valve MK, provision is made for another air shutter LK on the inlet of the heat exchanger WT, said air shutter being adjustable with intermediate settings between a first final position I with complete shutoff of the feed to the heat exchanger WT, and a second final position II with complete opening to the heat exchanger WT; in this connection, the air shutter LK is normally actuated synchronously with the mixed-air valve MK.

The function curves according to FIG. 6 show that according to the invention, for exploiting the off-heat in the intermediate regulating range, the additional air shutter LK is adjusted together with the mixed-air valve MK preferably continuously from the first final position I to the second final position II, or changed by means of a cycling valve TV with bypass, preferably with a cycling ratio that is variable in the sense of a continuous adjustment, from a complete closing position at the start of the intermediate regulating range, to a complete opening position at the end of the intermediate regulating range, changing the feed of cooling medium to the heat exchanger WT accordingly.

Figure 7:
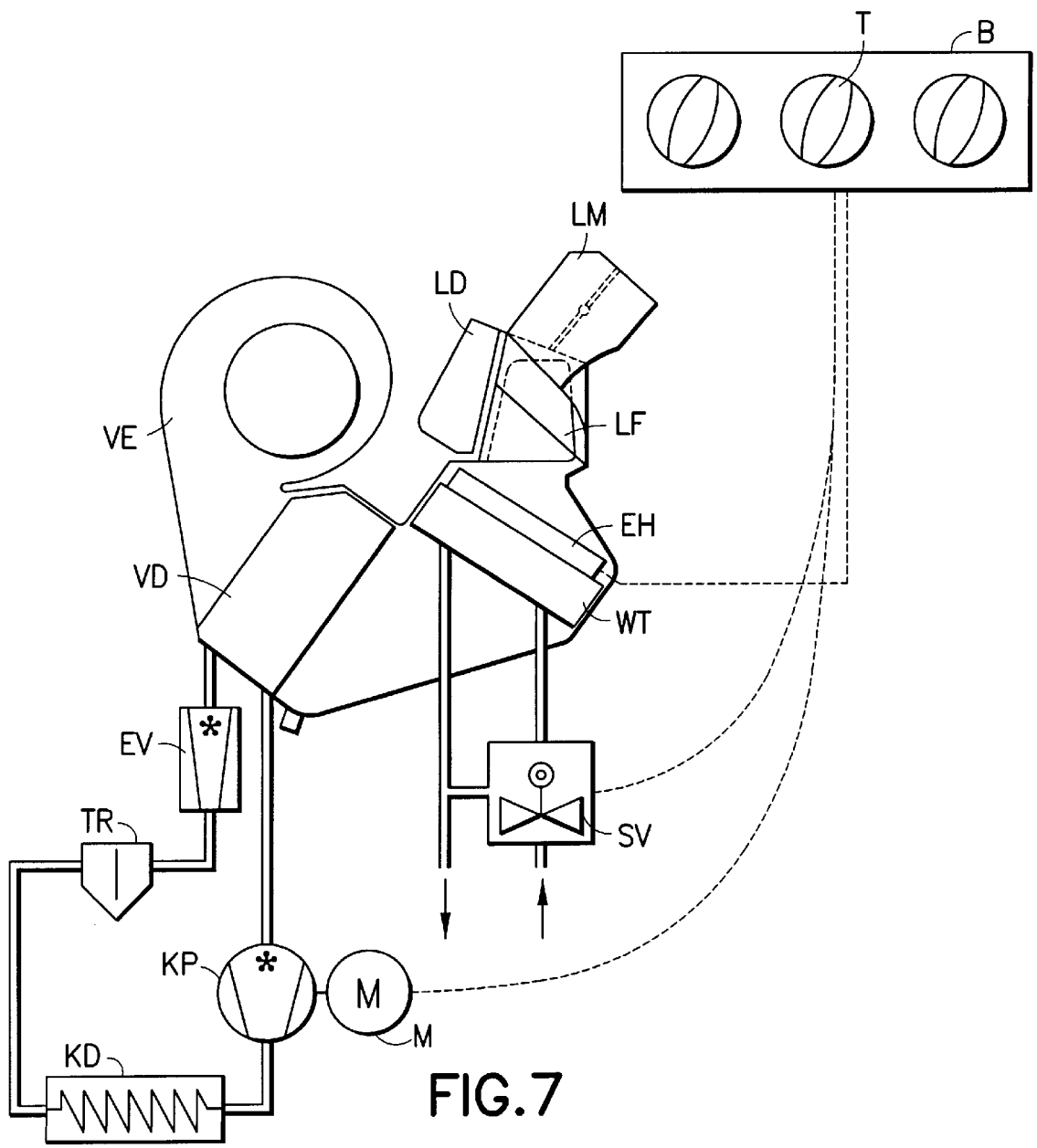
FIG. 7 is a schematic illustrating another preferred embodiment of an air conditioning system in accordance with the present invention.
Figure 8:
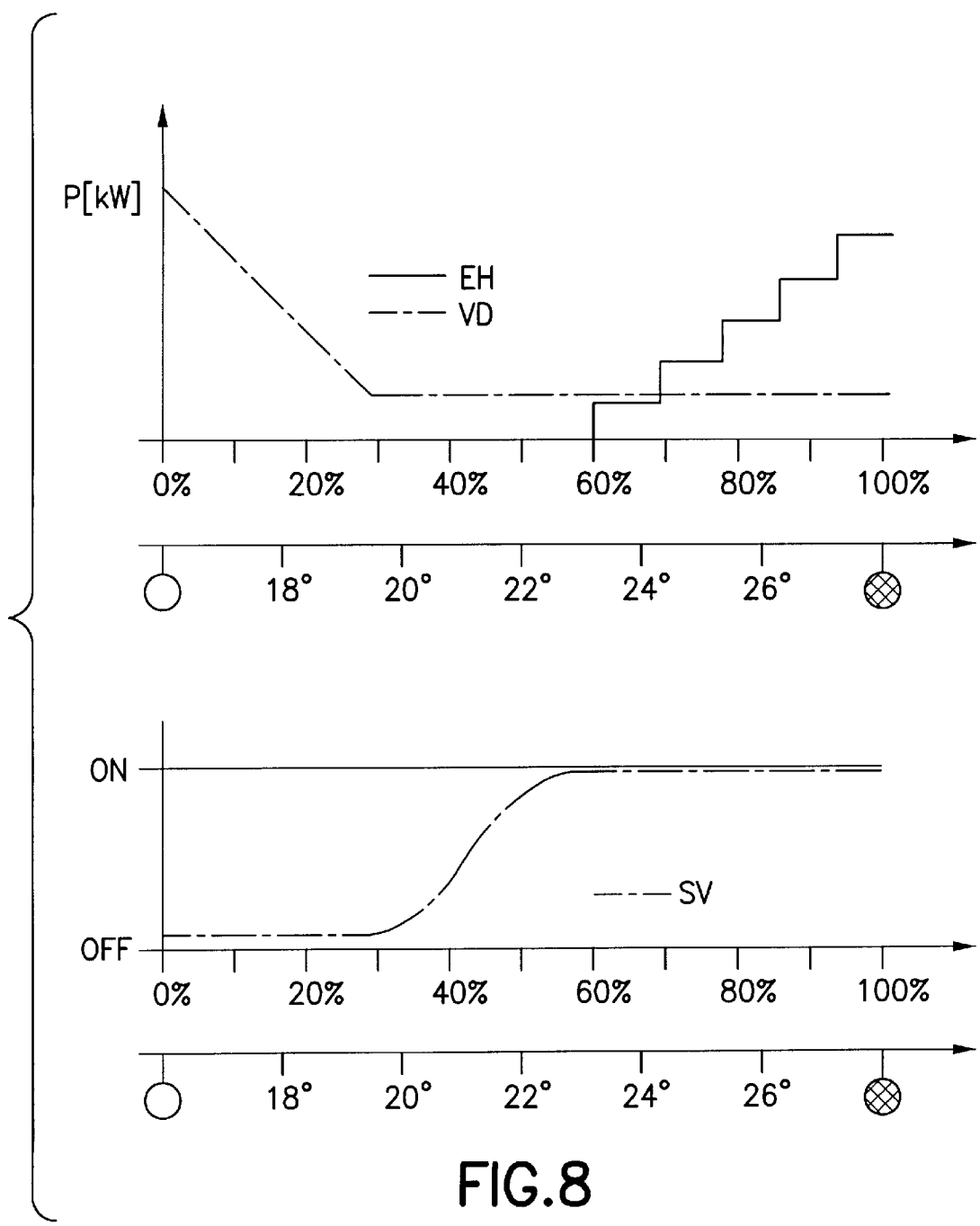
FIG. 8 is a schematic illustrating the functional curves associated with the preferred embodiment of the present invention illustrated in FIG. 7.

FIGS. 7 and 8 show an air-conditioning system according to the invention without air-side adjustment or control by means of a mixed air valve MK or without an air shutter LK; however, with a heat exchanger WT supplied with off-heat through connection with the cooling circuit of the driving engine of the motor vehicle, said heat exchanger being supplied continuously by the total stream of air on the inlet side. For the rapid adjustment of the desired temperature by means of the single temperature regulator T, provision is made again for a compressor KP, the latter being adjustable independently of the driving motor of the motor vehicle, for the evaporator VD, as well as for a useful heat source in the form of an electric heating EH. The refrigeration output is again adjusted within a preferred regulating range of 1 to 30% of the total regulating range of the single temperature regulator T; the adjustment of the heat output from a lower to a higher output of the electric heating EH is, in a final regulating range, between 60 and 100% of total regulating range of the temperature regulator T. In the intermediate regulating range, provision is made for a water-side adjustment of the cooling water flowing to the heat exchanger WT by means of a disk valve, SV, which is preferably continuously variable from a complete closing position, shutting off the feed to the heat exchanger WT at the start of the intermediate regulating range, to a complete opening position, releasing the feed to the heat exchanger at the end of the intermediate regulating range of the single temperature regulator T.

Figure 9:
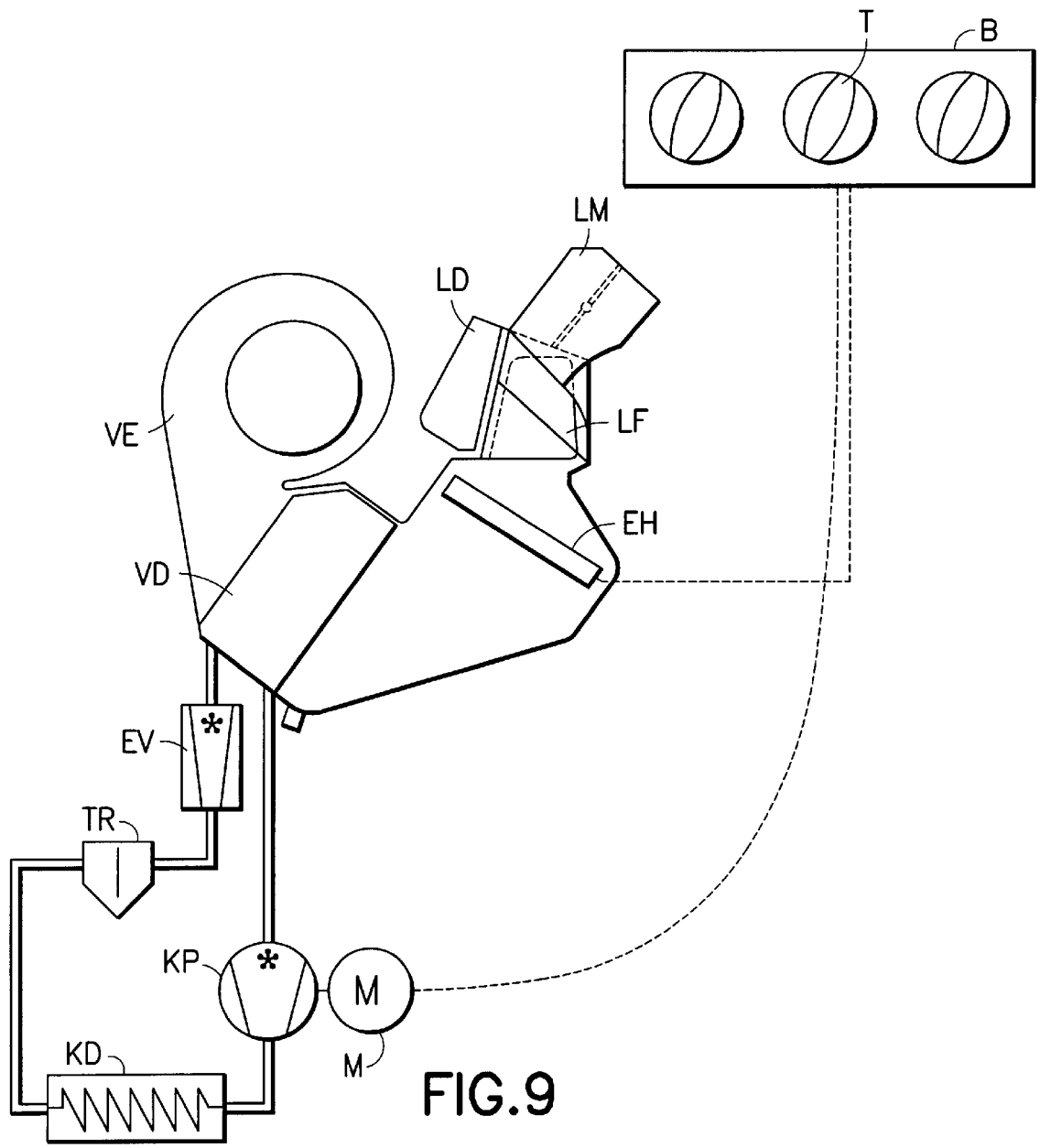
FIG. 9 is a schematic illustrating another preferred embodiment of an air conditioning system in accordance with the present invention.
Figure 10:
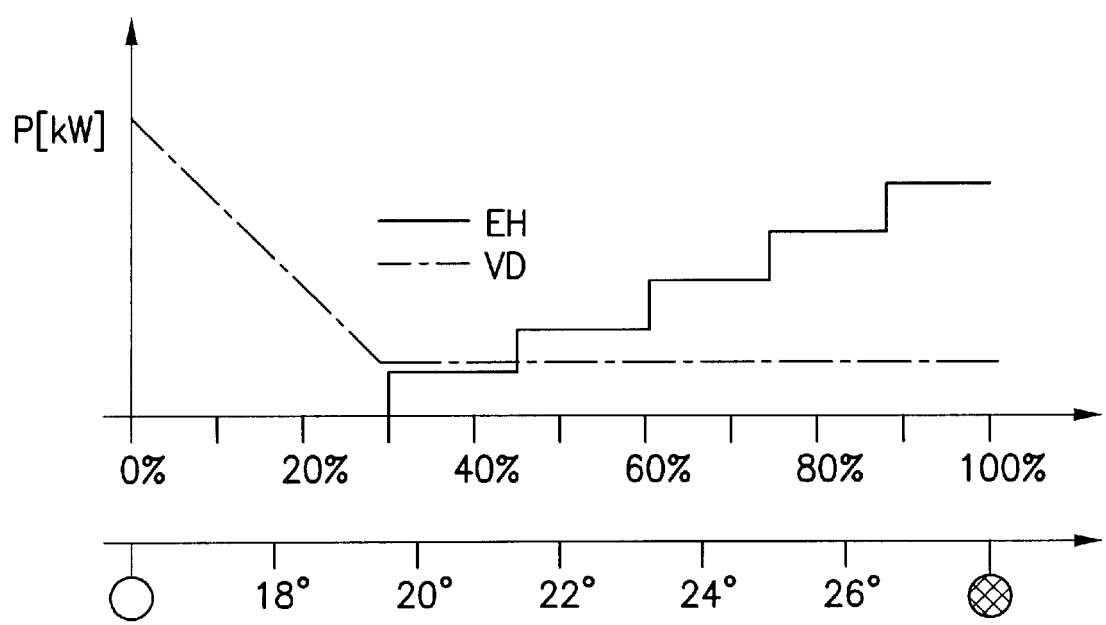
FIG. 10 is a schematic illustrating the functional curves associated with the preferred embodiment of the present invention illustrated in FIG. 9.

FIGS. 9 and 10 show an air-conditioning system according to the invention, which is particularly intended for use in vehicles without exploitation of the off-heat for the air conditioning, where a heat exchanger connected with the cooling circuit and supplied with off-heat of the driving engine of the motor vehicle is omitted, as a rule.

The energy-saving, rapid and simple temperature adjustment by means of the single temperature regulator takes place in the present case in a first regulating range through adjustment of the refrigeration output of the refrigeration unit from a higher to a lower refrigeration output, particularly an output barely still suitable for the dehumidification of the air in the interior space, on the one hand, and through an increase of the heat output of the electric heating EH in a subsequent regulating range from a lower output of heat to a higher one. Usefully, provision is made for a continuous adjustment for a refrigeration unit, and for a step-by-step adjustment for the heat source.

I claim:

1. Motor vehicle air-conditioning system with temperature adjustment of the interior space via a single temperature regulator between a lower cooling temperature, on the one hand, and an upper heating temperature, on the other hand, by cooling or heating a stream of air fed into the interior space accordingly, whereby by means of adjustment of the temperature regulator in a first regulating range, in particular in the range of 0 to 30% of the total regulating range, a refrigeration unit is adjustable from a high refrigeration output to a lower refrigeration output, and a final regulating range, a useful heat source is adjustable from a lower output of heat to a higher output of heat, whereby the refrigeration unit is operable independently of the motor drive of the motor vehicle and drivable by an electric motor, and the useful heat source is adjustable independently of the cooling circulation of the motor vehicle.

2. Motor vehicle air-conditioning system according to claim 1, with an intermediate regulating range between the first regulating range and the final regulating range with air-side adjustment by at least one mixed air valve [(MK)] in a mixing space [(MR)] and/or water-side adjustment by at least one valve [(TV; SV)] in a heat exchanger [(WT)].

3. Motor vehicle air-conditioning system according to claim 2, with the final regulating range in the range of 60% to 100% of the total regulating range of the temperature regulator.

4. Motor vehicle air-conditioning system according to claim 1, with continuous adjustment of the refrigeration unit [(VD; KP)] in the first regulating range.

5. Motor vehicle air-conditioning system according to claim 1, with step-by-step adjustment of the useful heat source in the final regulating range.

6. Motor vehicle air-conditioning system according to claim 1, with a mixing space with outlet-side air distribution ducts leading into the interior space of the motor vehicle, and with an outlet-side mixed air valve, the adjustment of which having intermediate settings between a first final position and a second final position, either cold air or fresh air can be admitted, on the one hand, or hot air on the other hand, said valve being continuously adjustable from the first final position at the start of the intermediate regulation range to the second final position at the end of the intermediate regulating range.

7. Motor vehicle air-conditioning system according to claim 6, with an additional air shutter, the adjustment of which having intermediate settings between a first final position and a second final position, the feed of air to the heat exchanger is fully blocked or, respectively, fully opened, said air shutter being continuously adjustable from the first final position at the start of the intermediate regulation range to the second final position at the end of the intermediate regulating range.

8. Motor vehicle air-conditioning system according to claim 1, with a heat exchanger with water-side adjustment heatable by a useful heat source and/or by off-heat of the motor vehicle, in particular by means of a valve and a bypass in the sense of a continuous adjustment of the valve between a closing position at the start of the intermediate regulating range and an opening position at the end of the intermediate regulating range.

9. Motor vehicle air-conditioning system according to claim 8, with a cycling valve [(TV)] with a cycle ratio variable in the sense of a continuous adjustment.

10. Motor vehicle air-conditioning system according to claim 1, with an electric heating element, the latter being adjustable in dependence of the temperature regulator from a minimum output of that to a maximum output of heat in the final regulating range of said regulator and, in the presence of a heat exchanger.

11. Motor vehicle air-conditioning system according to claim 1, with an electric continuous heater [(DH)], the latter being integrated in the circulation of the heat exchanger [(WT)] and adjustable in the final regulating range from minimum to maximum output of heat in dependence of the temperature regulator [(T)].

12. Motor vehicle air-conditioning system according to claim 1, with a compressor for the evaporator [(VD)], the latter being driven independently of the motor drive of the motor vehicle by an electric motor and adjustable in the first regulating range from maximum to minimum refrigeration output in dependence of the temperature regulator [(T)].

13. Motor vehicle air-conditioning system according to claim 3, with continuous adjustment of the refrigeration unit in the first regulating range.

14. Motor vehicle air-conditioning system according to claim 4, with step-by-step adjustment of the useful heat source in the final regulating range, said heat source preferably being independent of the cooling circulation of the motor vehicle.

15. Motor vehicle air-conditioning system according to claim 5, with a mixing space with outlet-side air distribution ducts leading into the interior space of the motor vehicle, and with an outlet-side mixed air valve, by and adjustment of which with intermediate settings between a first final position and a second final position, either cold air or fresh air can be admitted, on the one hand, or hot air on the other hand, said valve being set at the start of the intermediate regulating range to the first final position, and at the end of the intermediate regulating range to the second final position particularly continuously.

16. Motor vehicle air-conditioning system according to claim 7, with a heat exchanger with water-side adjustment heatable by a useful heat source and/or by off-heat of the motor vehicle, in particular by means of a valve and a bypass in the sense of a particularly continuous adjustment of the valve between a closing position at the start of the intermediate regulating range and an opening position at the end of the intermediate regulating range.

17. Motor vehicle air-conditioning system according to claim 7, with an electric heating element in particular a PTC-heating element, the latter being adjustable in dependence of the temperature regulator from a minimum output of that to a maximum output of heat in the final regulating range of said regulator and, in the presence of a heat exchanger, preferably arranged downstream of said heat exchanger.

18. Motor vehicle air-conditioning system according to claim 10, with an electric continuous heater, the latter being integrated in the circulation of the heat exchanger and adjustable in the final regulating range from minimum to maximum output of heat in dependence of the temperature regulator.

19. Motor vehicle air-conditioning system according to claim 11, with a compressor for the evaporator, the latter being driven independently of the motor drive of the motor vehicle by an electric motor and adjustable in the first regulating range from maximum to minimum refrigeration output in dependence of the temperature regulator.

20. Motor vehicle air-conditioning system according to claim 10, wherein said electric heating element is arranged downstream of said heat exchanger.

* * * * *